United States Patent [19]

Marchand et al.

[11] Patent Number: 4,964,016
[45] Date of Patent: Oct. 16, 1990

[54] MULTI-LAYER CERAMIC CAPACITORS HAVING, AS THE CONDUCTIVE ELEMENTS THEREIN, LAYERS OF PEROVSKITES CONTAINING OXYGEN AND NITROGEN

[75] Inventors: Roger Marchand, Cesson-Sevigne; Philippe Antoine, Aze; Paul L'Haridon, Vern Sur Seiche; Yves Laurent, Cesson-Sevigne, all of France

[73] Assignee: Centre National de la Recherche Scientifique, Paris, France

[21] Appl. No.: 380,732

[22] Filed: Jul. 14, 1989

Related U.S. Application Data

[62] Division of Ser. No. 172,192, Mar. 23, 1988, abandoned.

[30] Foreign Application Priority Data

Mar. 27, 1987 [FR] France ............................... 87 04287

[51] Int. Cl.⁵ .................. C01B 21/20; H01G 4/12; H01G 7/00
[52] U.S. Cl. .................................. 361/321; 29/25.42; 252/518; 252/520; 252/521; 423/385
[58] Field of Search .................. 423/385; 361/321; 29/25.42; 252/518, 520, 521

[56] References Cited

U.S. PATENT DOCUMENTS

| | | | |
|---|---|---|---|
| 3,441,517 | 4/1969 | Brauer et al. | 361/321 |
| 4,027,209 | 5/1977 | Maher | 361/321 |
| 4,063,341 | 12/1977 | Bouchard et al. | 361/321 |
| 4,131,479 | 12/1978 | Ichinose et al. | 361/321 |
| 4,377,840 | 3/1983 | Nair | 361/321 |
| 4,379,319 | 4/1983 | Wilson | 361/321 |
| 4,752,858 | 6/1988 | Yokotani et al. | 361/321 |
| 4,803,591 | 2/1989 | Miyashita et al. | 361/321 |

FOREIGN PATENT DOCUMENTS 0184951 6/1986 European Pat. Off. .
3150558 8/1982 Fed. Rep. of Germany .

OTHER PUBLICATIONS

Chemical Abstracts, vol. 105, No. 10, Sep. 8, 1986, p. 753, No. 899596.

*Primary Examiner*—Wayne A. Langel
*Attorney, Agent, or Firm*—Dressler, Goldsmith, Shore, Sutker & Milnamow, Ltd.

[57] ABSTRACT

The present invention relates to new conductive perovskites containing oxygen and nitrogen, their preparation and their use particularly as electrode material.

The conductive perovskites containing oxygen and nitrogen according to the invention correspond to the general formula I $$AB(O,N)_3 \quad (I)$$

in the cationic lattice of which:
A denotes a metal chosen from the metals of groups IA and IIA, yttrium and the lanthanides,
B denotes a metal chosen from the transition metals of groups IVA to IB,
on the express condition that at least one of the metals A and B is present in an oxidation state other than its normal maximum oxidation state.

12 Claims, 8 Drawing Sheets

FIG.1

Variation of the conductivity σ as a function of temperature for two samples of $LaW(O,N)_3$.

FIG_2

Variation of the conductivity σ as a function of temperature for the oxynitride of composition $NaWO_{0.8}N_{2.2}$.

FIG_3

Variation of the conductivity $\sigma$ as a function of temperature for the oxynitride of composition $CaWO_{1.5}N_{1.5}$.

FIG_5

Variation of the conductivity σ as a function of temperature for the oxynitride of composition $SrMoO_{1.9}N_{1.1}$.

FIG_6

Variation of the conductivity $\sigma$ as a function a temperature for the phase $LaVO_{3-x}N_x$ for $x = 0.3$.

FIG-7

MULTI-LAYER CERAMIC CAPACITORS HAVING, AS THE CONDUCTIVE ELEMENTS THEREIN, LAYERS OF PEROVSKITES CONTAINING OXYGEN AND NITROGEN

This application is a division of application Ser. No. 172,192, filed Mar. 23, 1988, abandoned.

The present invention relates to new perovskites containing oxygen and nitrogen and endowed with conductive properties permitting their use as electrode material, in particular as an electrode in multilayer ceramic capacitors. The invention also relates to the process for the preparation of these new perovskites.

Patent Application EP-A-No. 0,184,951 describes perovskites containing oxygen and nitrogen of formula $ABO_{3-n}N_n$, in the cationic lattice of which the metal cations A and B are present in their normal maximum oxidation state. Such perovskites exhibit dielectric properties.

The present invention relates to perovskites containing oxygen and nitrogen corresponding to the general formula I:

$$AB(O,N)_3 \qquad (I)$$

in the cationic lattice of which:

A denotes a metal chosen from the metals of groups IA and IIA, yttrium and the lanthanides, B denotes a metal chosen from the transition metals of groups IVA to IB, on the express condition that at least one of the metals A and B is present in an oxidation state other than its normal maximum oxidation state.

In the cationic lattice of the perovskites according to the invention, the metal B will generally be present in an oxidation state lower than its normal maximum oxidation state, that is to say that the presence of, for example, Ti(III), V(IV) or V(III), Mo(V) and W(V) will be observed. However, in some particular cases, the metal B will be present in an oxidation state higher than its normal maximum oxidation state. Thus, the presence of Cu(III) or of Fe(IV) will be observed, for example. In the case of copper, there will therefore be a delocalization of the electrons or a mixed valency characterized by the simultaneous presence of Cu(II) and Cu(III).

According to another feature of the invention, the perovskites containing oxygen and nitrogen are those wherein at least one of the metals A and B is present in a mixed valency state.

The presence in the cationic site of certain elements such as copper, which has a preference for a lower coordination and tends towards the planar square coordination, gives rise, in the perovskites of the invention, to vacant anionic sites which may attain up to approximately 20% of the anionic elements.

According to another feature of the invention, the perovskites may also have a cationic vacancy in the metal A. Thus, for example, in the case where the metal A is lanthanum, stoichiometry defects exist in the site A, and these lead to a mixed valency in the associated site B, for example the presence of vanadium with valencies III and IV.

All these stoichiometric anomalies, vacant anionic or cationic sites are reflected in a mixed valency of one of the elements in the cationic lattice, that is to say by an electron delocalization which is responsible precisely for the conductive properties of the perovskites of the invention. These electrical properties, as a function of the precise nature of the perovskites according to the invention, correspond to a semiconductor state of n or p type, semimetallic or else metallic. In all the cases, these properties may be exploited when the conductive perovskites according to the invention are employed as electrode material, particularly as a capacitor electrode.

The preferential application of these conductive perovskites of general formula I relates to capacitors with a multilayer ceramic structure which are obtained by cosintering conductive perovskites according to the invention with dielectric perovskites such as described in patent application No. EP-A-No. 0 184 951.

Lastly, the present invention relates to the process for the preparation of the conductive perovskites of general formula I. This process consists in subjecting a mixed oxide of metals A and B to nitriding under a stream of ammonia at a temperature of between 700° C. and 900° C. In particular, the oxide will be chosen from tungstates such as $CaWO_4$, $SrWO_4$, $BaWO_4$ and $Ln_2W_2O_9$, molybdates such as $SrMoO_4$ and vanadates such as $LaVO_4$ and $LaVO_3$.

Some particular examples of the abovementioned perovskites containing oxygen and nitrogen and corresponding to the general formula I will be mentioned below by way of illustration. All these perovskites exhibit a remarkable electrical conductivity.

Other features and benefits of the present invention will become apparent from reading the detailed description which is given below with reference to various particular examples of preparation and of characterization of conductive perovskites, which are given by way of illustration.

EXAMPLES 1 to 4

Ca(Sr,Ba)-W and Sr-Mo pairs

Double oxides with a scheelite structure of the $CaWO_4$ type are used as starting materials. The alkaline-earth metal or lanthanide tungstates or molybdates are prepared, account being taken of the sublimation of tungsten or molybdenum oxides at high temperature.

When the reaction between these oxides and the alkaline-earth metal oxide originating from the thermal decomposition of the carbonate takes place at a temperature such that the losses of tungsten or molybdenum oxide by sublimation can be neglected, the former may be carried out in a single stage. Thus, for example, the preparation of the scheelite phases $Ca(Sr,Ba)WO_4$ is carried out by heating stoichiometric quantities of calcium carbonate and of the oxide $WO_3$ in a muffle furnace, in an alumina crucible. The temperature is set at 750° C. for a period of 72 hours.

On the other hand, preparation of compounds of formula $Ln_2W_2O_9$ or $Ln_2WO_6$ requires considerably higher temperatures. The operation is then performed in two successive stages.

The first stage consists in precombining the oxide $WO_3$ into the mixed $Ln_2O_{3-x}WO_3$ (x=2 or 1) by heating for 14 hours in a muffle furnace at a temperature of 880° C. After cooling, the product obtained is carefully ground up in an agate mortar and is then reheated to temperatures of between 1,100° and 1,200° C. depending on the lanthanide employed. The heating time is set at 72 hours.

In all cases, the purity of the reaction products is checked by x-ray crystallographic analysis.

The nitriding under a stream of ammonia is carried out at temperatures of between 700° and 900° C. for a period of approximately 14 hours.

The flow rate of ammonia is proportionately higher the higher the temperature, so as to prevent, as far as possible, the dissociation into nitrogen and hydrogen before contact with the product. The overall reaction can be written, schematically:

$$ABO_x + NH_3 \rightarrow ABO_yN_z + H_2O \uparrow$$

It is clear that the reaction is not total. Some of the ammonia dissociates, and the nitrogen and hydrogen produced by this dissociation entrain the water vapor originating from the reaction.

During the cooling, in order to avoid any hydrolysis, the ammonia stream is substituted with a purge using U-grade nitrogen.

The nitrogen-oxygen substitution of the preceding formation reaction is reflected in a loss in mass which is verified by weighing the materials before and after reaction.

The various experiments carried out while the temperature, in particular, was varied, demonstrate that, after reaction, a pure phase composition which always remains substantially identical is obtained.

Thus, nitrogen determination in the case of the Ca-W-O-N compounds varies between 7.5 and 7.7% for samples originating from 13 different preparations. The reproducibility of the determination has been verified for one and the same preparation. These experimental values are not significantly different to make it possible to conclude that a very extensive single-phase domain exists under our operating conditions.

The highest nitrogen concentration obtained (7.74%) corresponds to the formula:

$$CaWO_{1.51}N_{1.49}$$

very close to $CaWO_{1.5}N_{1.5}$, for which calculation gives a nitrogen content of 7.81%. The absolute difference of 1% between this value and the experimental value is of the same order of magnitude as the accuracy of the determination.

In this example, tungsten has a mean oxidation state very close to 5.5 and the phase may be formally written:

$$CaW(VI)_{1-x}W(V)_xO_{1+x}N_{2-x}$$

with $x_{exp} = 0.5_1$ in this case.

Insofar as the pair Sr-W is concerned, nitrogen determination (% N=4.8%) leads to the formula $SrWO_{1.9}N_{1.1}$, in which the oxidation state of the tungsten is very close to V. Using the same formulation as previously, the value of x is 0.9.

In an analogous manner, the corresponding Ba-W perovskite phase has been identified by x-ray crystallographic analysis in the reaction mixture.

In the case of the pair Sr-Mo, nitrogen determinations give contents of between 6.5 and 7.2% and lead to the formula:

$$SrMo(VI)_{1-x}Mo(V)_xO_{1+x}N_{2-x}$$

with $0.8_3 < x < 0.9_5$ that is, an average formula $SrMoO_{1.9}N_{1.1}$.

All these compounds have been characterized by x-ray crystallography analysis.

In all the cases the lattice appears to be cubic and the analysis of the powder diagrams is given in Table I.

Calculation of the data, which are refined using a least-squares methods, gives the following values:

$CaWO_{1.5}N_{1.5}$ a=3.924 (1) Å

$SrWO_{1.9}N_{1.1}$ a=3.989 (3) Å

$BaWO_{1+x}N_{2-x}$ a=4.117 (3) Å

$SrMoO_{1.9}N_{1.1}$ a=4.005 (3) Å

In a powdered state, all these compounds exhibit a marked hygroscopic character. The rate of this degradation is the highest in the case of $SrWO_{1.9}N_{1.1}$. Release of ammonia is observed and the initial oxide is obtained by an oxidation process.

TABLE I

Powder diagrams for the oxynitrides $A^{(II)}W(O,N)_3$ ($A^{(II)}$ = Ca, Sr, Ba) and $SrMoO_{1.9}N_{1.1}$

| $CaWO_{1.5}N_{1.5}$ | | | $SrWO_{1.9}N_{1.1}$ | | | $BaWO_{1+x}N_{2-x}$ | | | $SrMoO_{1.9}N_{1.1}$ | | |
|---|---|---|---|---|---|---|---|---|---|---|---|
| $d_{hkl}$ | hkl | $I/I_o$ | $d_{hkl}$ | hkl | $I/I_o$ | $d_{hkl}$ | hkl | $I/I_o$ | $d_{hkl}$ | hkl | $I/I_o$ |
| 3.926 | 100 | 60 | 3.978 | 100 | ms | 4.114 | 100 | <1 | 4.012 | 100 | 5 |
| 2.776 | 110 | 100 | 2.818 | 110 | VS | 2.917 | 110 | 100 | 2.830 | 110 | 100 |
| 2.265 | 111 | 10 | | | | | | 11 | 2.315 | 111 | <1 |
| 1.961 | 20 | 30 | 1.983 | 200 | mS | 2.058 | 200 | 30 | 2.016 | 200 | 30 |
| 1.756 | 210 | 25 | 1.783 | 210 | W | | | | | | |
| 1.603 | 211 | 45 | 1.622 | 211 | S | 1.684 | 211 | 40 | 1.634 | 211 | 30 |

TABLE I-continued

Powder diagrams for the oxynitrides $A^{(III)}W(O,N)_3$ ($A^{(II)}$ = Ca, Sr, Ba) and $SrMoO_{1.9}N_{1.1}$

| CaWO$_{1.5}$N$_{1.5}$ | | | SrWO$_{1.9}$N$_{1.1}$ | | | BaWO$_{1+x}$N$_{2-x}$ | | | SrMoO$_{1.9}$N$_{1.1}$ | | |
|---|---|---|---|---|---|---|---|---|---|---|---|
| $d_{hkl}$ | hkl | I/I$_o$ | $d_{hkl}$ | hkl | I/I$_o$ | $d_{hkl}$ | hkl | I/I$_o$ | $d_{hkl}$ | hkl | I/I$_o$ |
| 1.387 | 220 | 15 | 1.401 | 220 | mS | 1.453 | 220 | 50 | 1.415 | 220 | 15 |
| 1.308 | 300 | 10 | 1.332 | 300 | W | 1.370 | 300 | 25 | | | |
| 1.241 | 310 | 20 | 1.263 | 310 | mS | 1.244 | 311 | 15 | 1.266 | 310 | 10 |

EXAMPLES 5 to 8

Ln-W(Ln=La,Pr,Nd,Eu) pairs

When considering the double cation substitution Ti-(IV)-W(VI) and Ba(II)-Ln(III) in relation to barium titanate BaTiO$_3$, it might be, a priori, expected that a completely nitrogenated perovskite of ABN$_3$ stoichiometry would be obtained.

In fact, perovskites are obtained as the lanthanide goes from lanthanum to neodymium, but these are partially oxygenated because of the fact that the tungsten does not maintain its maximum oxidation state.

In the case of neodymium, the formation of a scheelite phase of formula NdW(VI)O$_3$N is also observed.

Europium forms a special case because of the stability of the oxidation state II, and a perovskite phase is obtained with this element instead of the scheelite which is normally expected.

The preparation of these compounds is carried out by nitriding, in a stream of ammonia, the tungstates Ln$_2$W$_2$O$_9$ which are prepared as indicated earlier. The reaction temperatures are between 700° and 900° C.

The pure perovskite phase is obtained when Ln=La or Pr.

In the case of neodymium, if the operation is carried out close to the thermal threshold of the reaction (approximately 700° C.), the scheelite phase is obtained predominantly. The proportion of this phase decreases when the heating is prolonged or when the operation is carried out at a higher temperature.

The composition of these phases has been determined by chemical determination of nitrogen. In the case of the La-W pair, the experimental content is between 8.4 and 9.2%. In the case of the formula:

$$LaW(VI)_{1-x}W(V)_xO_xN_{3-x}$$

this gives a value of x of between 0.8 and 0.6.

The same applies to the case of neodymium, in whose case the nitrogen content is between 8.2 and 9.2% (0.8>x>0.6).

Lastly, the results of analysis for a praseodymium compound give a value of x=0.75 (experimental nitrogen content: 8.5%), and hence the formula $$PrWO_{0.75}N_{2.25}.$$

For a given lanthanide, no shift in the diffraction lines is observed by x-ray crystallographic analysis for these various compositions.

While the kinetics of formation of the perovskite phase become progressively slower as the radius of the lanthanide decreases, this phase is easily obtained with europium, and this, in itself, proves the presence of divalent europium of a greater ionic radius than for the valency III in the compound.

The experimental results are as follows:

| Temperature of preparation | Experimental nitrogen content (% by weight) | Formula |
|---|---|---|
| 740° C. | 6.4$_0$ | EuWO$_{1.25}$N$_{1.75}$ |
| 860° C. | 7.3$_5$ | EuWO$_{1.0}$N$_{2.0}$ |

The compounds involved in this case exhibit elements with mixed valency in the two sites A and B of the perovskite.

The interreticular distances corresponding to the h k l planes for the various compounds are collated in Table II.

These patterns fit a cubic lattice, the data for which, refined by a least-squares method, are given below:

$$LaWO_{0.6}N_{2.4} \; a=3.994 \; (1) \; \text{Å}$$

$$PrWO_{0.75}N_{2.25} \; a=3.967 \; (1) \; \text{Å}$$

$$NdWO_{0.7}N_{2.3} \; a=3.964 \; (1) \; \text{Å}$$

$$EuWO_1N_2 \; a=3.974 \; (1) \; \text{Å}$$

In contrast to the preceding perovskites which involved an alkaline-earth element, the equivalent phases with a lanthanide do not exhibit any hygroscopic behavior.

The action of oxygen has been investigated by thermogravimetric analysis in the case of the lanthanum compound. The reaction begins at 300° C. and leads to the tungstate La$_2$W$_2$O$_9$.

TABLE II

Powder diagrams of the oxynitrides LnW(O,N)$_3$ - Ln = La, Pr, Nd, Eu

| LaWO$_{0.7}$N$_{2.3}$ | | | PrWO$_{0.75}$N$_{2.25}$ | | | NdWO$_{0.7}$N$_{2.3}$ | | | EuWON$_2$ | | |
|---|---|---|---|---|---|---|---|---|---|---|---|
| $d_{hkl}$ | hkl | I/I$_o$ | $d_{hkl}$ | hkl | I/I$_o$ | $d_{hkl}$ | hkl | I/I$_o$ | $d_{hkl}$ | hkl | I/I$_o$ |
| 3.995 | 100 | 5 | 3.969 | 100 | 5 | 3.960 | 100 | 5 | 3.978 | 100 | 5 |
| 2.821 | 110 | 100 | 2.805 | 110 | 100 | 2.805 | 110 | 100 | 2.814 | 110 | 100 |
| 1.998 | 200 | 25 | 1.981 | 200 | 25 | 1.981 | 200 | 25 | 1.987 | 200 | 25 |
| 1.787 | 210 | <1 | 1.774 | 210 | 2 | 1.774 | 210 | 3 | 1.778 | 210 | 3 |
| 1.631 | 211 | 35 | 1.618 | 211 | 40 | 1.618 | 211 | 40 | 1.623 | 211 | 35 |
| 1.412 | 220 | 15 | 1.402 | 220 | 15 | 1.400 | 220 | 15 | 1.404 | 220 | 15 |
| 1.262 | 310 | 15 | 1.255 | 310 | 15 | 1.254 | 310 | 15 | 1.256 | 310 | 15 |

EXAMPLE 9

La-V pair

In this system, in contrast to those preceding, there exists an oxygen compound of formula $LaVO_3$ of perovskite structure. This is not an ideal structure: it exhibits an orthorhombic deformation identical with that observed in $GdFeO_3$. In the present case, the lattice appears to be square.

This compound introduces defects in stoichiometry in the A site. These results in a single-phase composition domain formulated as $La_{\frac{2}{3}+y}\square_{\frac{1}{3}-y}VO_3$, in which the vanadium has the valencies III and IV. Thus the overall formula $La_{0.9}VO_3$ corresponds to the value of y equal to 0.23. The developed electronic formula may be written:

$$La_{0.9}\square_{0.1}V_{0.7}^{(III)}V_{0.3}^{(IV)}O_3$$

The substitution of some of the oxygen by nitrogen is another way of increasing the formal charge on the vanadium while maintaining the La/V ratio equal to 1.

The preparation of $LaVO_3$ may be carried out by reduction of the vanadate $LaVO_4$ in a stream of hydrogen, in the temperature range 700°–800° C.

The use of ammonia makes it possible to have an atmosphere which is both nitriding and reducing. The overall reaction can then be written:

$$LaVO_4 + \frac{2 + 2x}{3} NH_3 \rightarrow LaV(III)_{1-x}V(IV)_xO_{3-x}N_x +$$

$$(1 + x) H_2O + \frac{2 - x}{6} N$$

Various experiments have been carried out at temperatures of between 650° and 800° C. In all cases, the reaction kinetics are slow and the final composition undergoes a change, even after heating which may exceed several days.

There exists a wide range of composition which extends from $LaV(III)O_3$ to $LaV(III)_{0.1}V(IV)_{0.9}O_{2.1}N_{0.9}$. This latter phase has been obtained after two heating periods of a week with a grinding operation in between. Manipulations for shorter periods result in intermediate compositions. Long-term tests make it possible to obtain the nitrogen-richest composition in the range, that is to say $LaV(IV)O_2N$, which has excellent electroconductive properties.

In all the preceding cases, the composition is established by chemical determination of nitrogen. This determination requires a digestion of the product using molten potassium hydroxide. It has been observed that this digestion was more difficult in the case of the phases of the La-V pair than with the other perovskites containing nitrogen.

Oxidation has been investigated by thermogravimetry in oxygen. It begins at 250° C. and leads to $LaVO_4$.

X-ray crystallographic analysis of the various phases in the domain of composition shows a change in the crystal lattice.

In addition to the characteristic lines of the perovskite, the $LaVO_3$ pattern shows low intensity lines due to the symmetry of the pseudosquare lattice which is derived from the cubic lattice according to:

$$a_{sq.} = a_{cub.}\sqrt{2} \quad c_{sq.} = 2 a_{cub.}$$

As the nitrogen content increases, these low intensity lines are seen to disappear gradually and the lattice seems to appear cubic. However, a marked dissymmetry in the profile of certain lines must be noted, indicating that the actual symmetry is not cubic, but the accuracy of the x-ray diffraction patterns does not permit the lattice symmetry to be suggested unambiguously.

The lines seen in the diffraction patterns of $LaVO_3$ and $LaVO_{2.1}N_{0.9}$ are collated in Table III.

TABLE III

Powder pattern of the oxynitride $LaVO_{2.1}N_{0.9}$ compared with that of the oxide $LaVO_3$.

| | $LaVO_3$ | | | $LaVO_{2.1}N_{0.9}$ | |
|---|---|---|---|---|---|
| $d_{hkl}$ | hkl | $I/I_o$ | $d_{hkl}$ | hkl | $I/I_o$ |
| 3.296 | 110 | 20 | 3.909 | 100 | 20 |
| 3.496 | 111 | 5 | | | |
| 2.772 | 200 | 100 | 2.759 | 110 | 100 |
| 2.614 | 201 | 5 | | | |
| 2.362 | 211 | 5 | | | |
| 2.265 | 202 | 20 | 2.257 | 111 | 20 |
| 2.171 | 113 | 5 | | | |
| 1.961 | 220 | 30 | 1.951 | 200 | 30 |
| 1.903 | 221 | 5 | | | |
| 1.754 | 310 | 10 | 1.743 | 210 | 10 |
| 1.713 | 311 | 5 | | | |
| 1.601 | 312 | 45 | 1.593 | 211 | 40 |
| 1.457 | 313 | 5 | | | |
| 1.388 | 400 | 15 | 1.376 | 220 | 15 |
| 1.365 | 401 | 5 | | | |
| 1.308 | 330 | 10 | 1.302 | 300 | 5 |

The lattice data for phases exhibiting various compositions have been refined from experimental interreticular distances. The results are shown in Table IV.

TABLE IV

| Composition | $a_{cub.}$(Å) | $a_{sq.}$ (Å) | $c_{sq.}$ (Å) | V (Å$^3$) |
|---|---|---|---|---|
| $LaVO_3$ | | 5.547 (1) | 7.847 (6) | 241.44 |
| $LaVO_{2.8}N_{0.2}$ | | 5.542 (1) | 7.825 (6) | 240.33 |
| $LaVO_{2.3}N_{0.7}$ | 3.907 (1) | | | 238.59 |
| $LaVO_{2.1}N_{0.9}$ | 3.899 (2) | | | 237.15 |

STRUCTURAL STUDY OF $LaWO_xN_{3-x}$ (x=0.6)

The neutron diffraction study of the oxynitride $LaWO_{0.6}N_{2.4}$ shows that the crystal lattice is not cubic in symmetry, but square, with $$a_{sq.} = a_{cub.}\sqrt{2}$$

$$c_{sq.} = 2a_{cub.}$$

Figure 1:
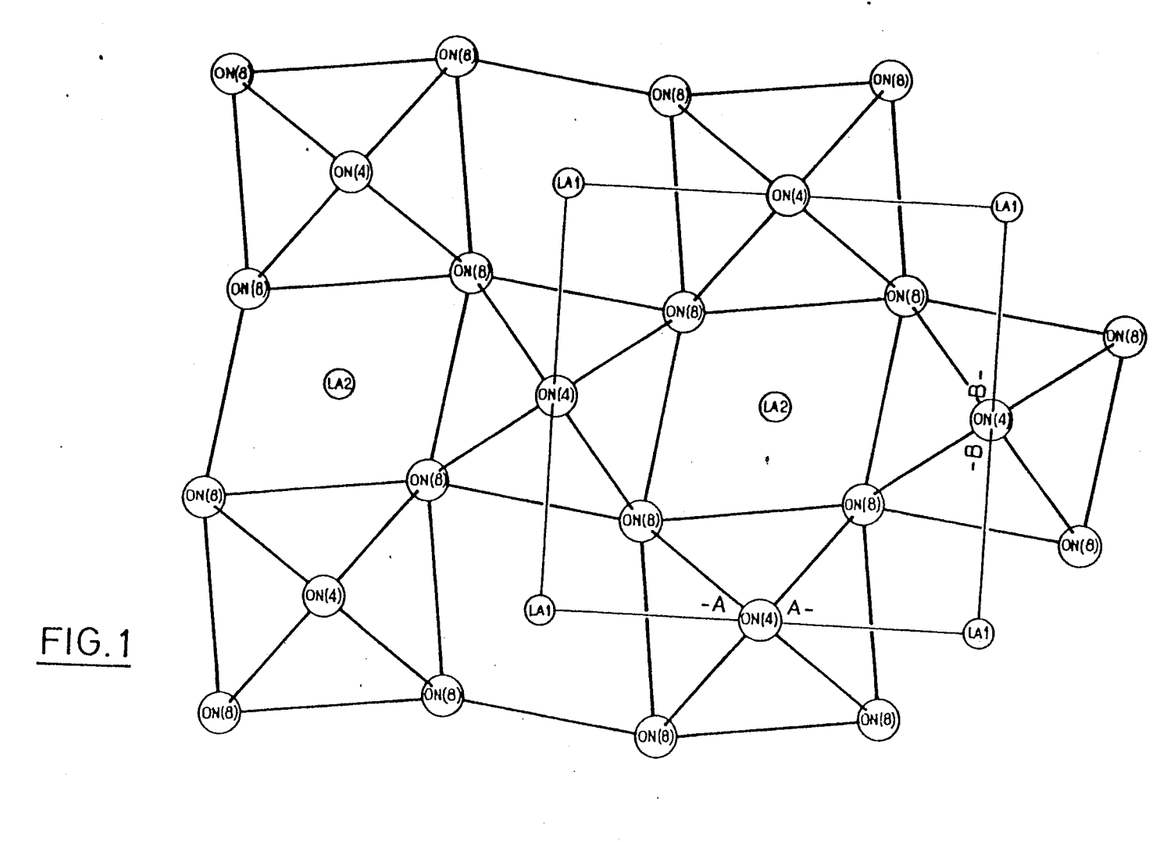
FIG. 1 is a projection of the structure of the oxynitride $LaWO_{0.6}N_{2.4}$ along .

The space group is $I\bar{4}$. Calculation shows that the oxygen and nitrogen atoms are not ordered. FIG. 1 is a projection of the structure along $\vec{c}$, in which a deformation in the chain arrangement of the tungsten coordination octahedra can be seen.

ELECTRICAL PROPERTIES

The compounds whose synthesis has been described above were pressed into the form of $0.1 \times 0.3 \times 1.2$ cm parallelepipedal bars, at a pressure of $5 \times 10^3$ kg cm$^{-2}$. In order to avoid a partial decomposition of the samples after pressing, the bars were not subjected to any heat treatment. Under these conditions the compactness of the bars is close to 50%.

The conductivity was measured using the method of four aligned points, described by J. Laplume "L'Onde Electrique", 335 (1955), 113. It has been calculated by measuring the current intensity/voltage ratio between the points in both directions of current flow to minimize the dissymmetry effects, which are always possible, between the contacts.

The thermoelectric power was measured in the following manner. The bar was held between two platinum heads. An oven permitted a temperature difference $\Delta T=10$ K. to be maintained between the two heads, and hence between the two ends of the bar. The e.m.f. generated at the sample boundaries was measured with the aid of a Keithley model 616 electrometer. Under these conditions, the values of the thermoelectric power were determined with an error of the order of $\pm 1$ $\mu$V K$^{-1}$.

The electrical properties of the samples were measured as a function of temperature in the range 80°–400° K. Temperatures above 400° K. were rejected to avoid the risk of changing the composition of the bars. In the case of low temperatures (T<290° K.), the measurements were carried out under helium at a pressure of 200 mbar, and under the same pressure of argon in the case of temperatures above ambient temperature.

1. Compounds LnW(O,N)$_3$ (Ln=La, Nd)

Figure 2:
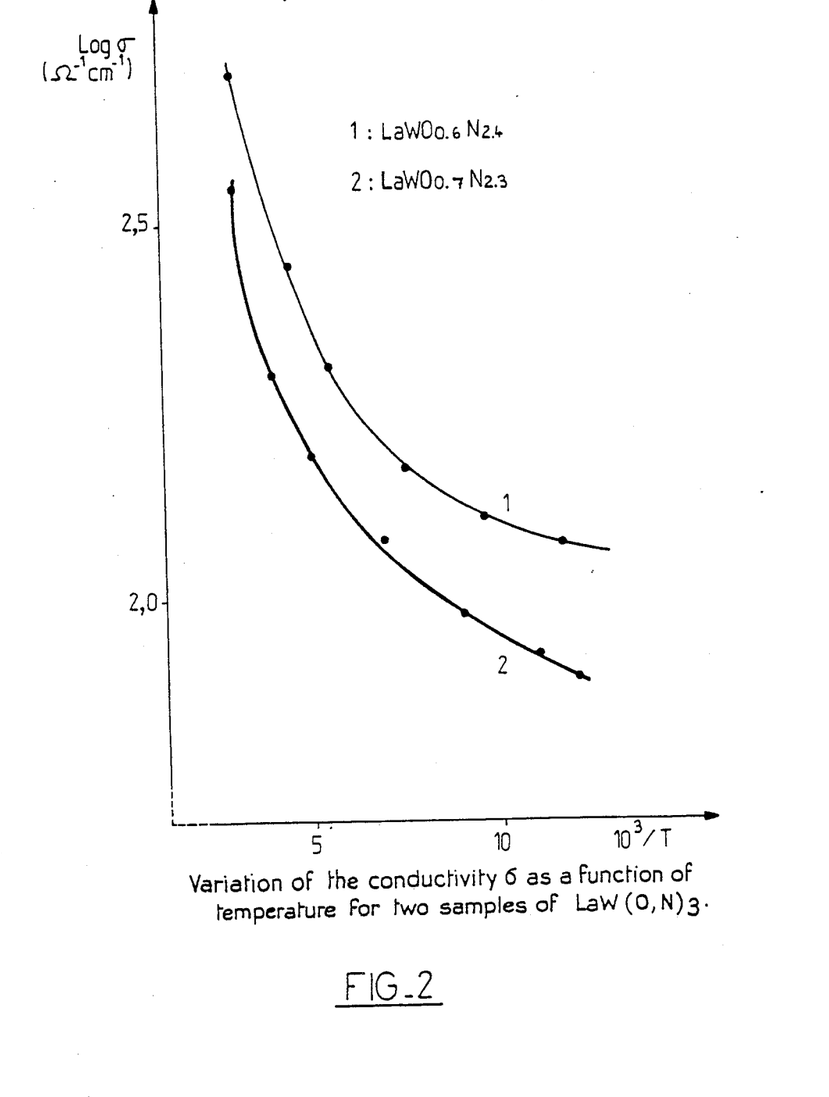
FIG. 2 shows the variation of the conductivity 6 as a function of temperature for two samples of $LaW(O,N)_3$.
Figure 3:
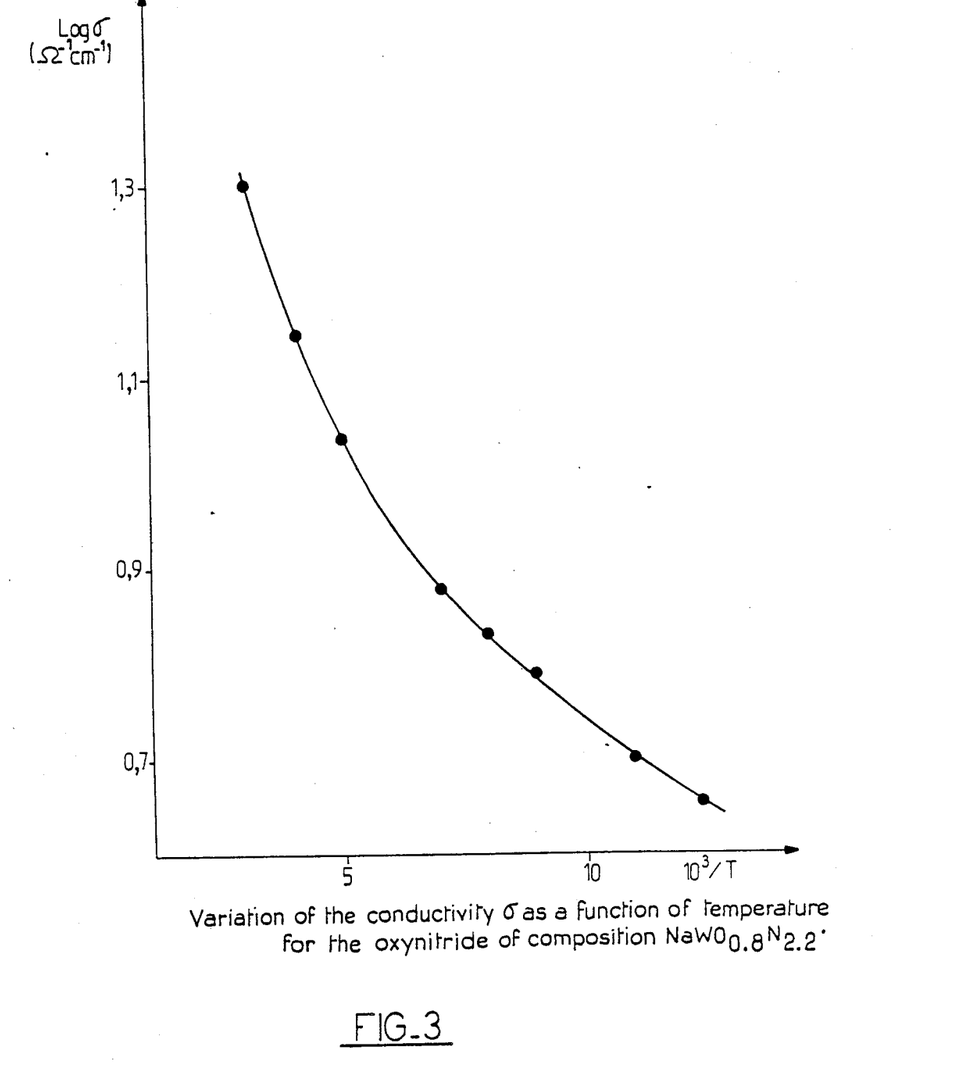
FIG. 3 shows the variation of a conductivity 6 as a function of temperature for the oxynitride of composition $NaWO_{0.8}N_{2.2}$.

Three samples were studied: LaWO$_{0.6}$N$_{2.4}$, LaW$_{0.7}$N$_{2.3}$ and NdW$_{0.8}$N$_{2.2}$. The change in conductivity as a function of temperature for these three samples is shown in FIGS. 2 and 3. Two approximately linear sections can be made out in each of these curves, one at low temperature (T<170° K.) and one at higher temperature (T>° 200 K.). In each of these sections the conductivity may be expressed in the conventional form for the semiconductors $\sigma=\sigma_o \exp(-\Delta E/KT)$. The activation energies which can be calculated from the experimental results are very low and practically independent of the composition (cf. following table). The transition between the two temperature regions takes place gently.

| Composition | $\Delta E$ (eV) | |
|---|---|---|
| | T < 170 K | T > 200 K |
| LaWO$_{0.6}$N$_{2.4}$ | 0.002 | 0.012 |
| LaWO$_{0.7}$N$_{2.3}$ | 0.003 | 0.013 |
| NdWO$_{0.8}$N$_{2.2}$ | 0.003 | 0.015 |

Figure 4:
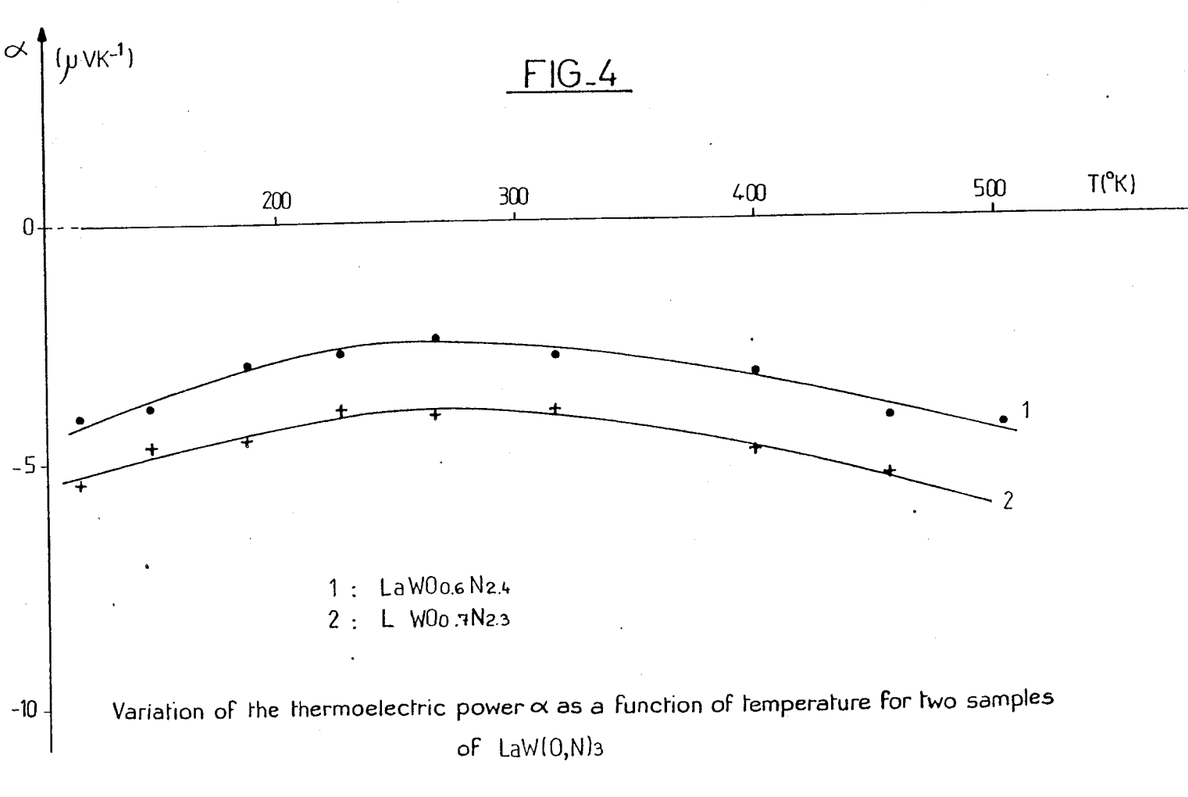
FIG. 4 shows the variation of the thermoelectric power $\alpha$ as a function of temperature for two samples of $LaW(O,N)_3$.

The change in the thermoelectric power as a function of temperature is shown for the two lanthanum-containing phases in FIG. 4. The negative value of $\alpha$ shows that the predominant charge carriers are electrons. $\alpha$ is very low, since at normal temperature $|\alpha| < 5$ $\mu$V K$^{-1}$, and is practically independent of temperature, within experimental error.

The low value of $\alpha$ shows that the density of carriers is very high, which agrees with the number of potential carriers deduced from the mean oxidation state of the tungsten, determined from the results of analysis, which is between 5.2 and 5.4 for all the phases investigated. The apparent temperature-independence of $\alpha$ shows that the number of carriers remains practically unchanged throughout the temperature region investigated. From this it follows that in the transport mechanism of these phases it is the mobility of the carriers which is activated. In effect, the conductivity of a sample is expressed as:

$$\sigma = ne\mu$$

where n denotes the number of carriers per unit volume,
e their charge, and
$\mu$ the mobility.

2. Compounds CaW(O,N)$_3$, SrMo(O,N)$_3$ and LaV(O,N)$_3$

In a first stage, exploratory measurements were carried out on the following compounds:

2.1 CaWO$_{1.5}$N$_{1.5}$

Figure 5:
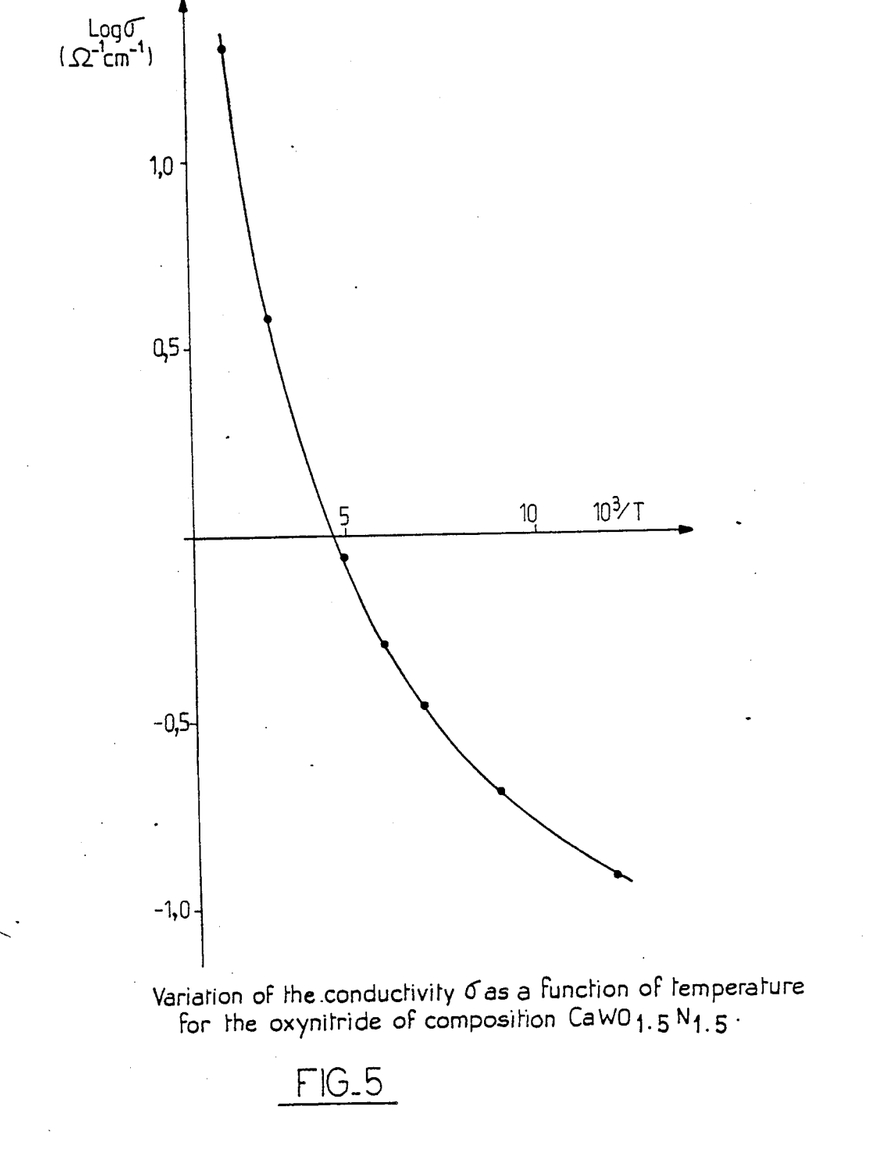
FIG. 5 shows the variation of the conductivity 6 as a function of temperature for the oxynitride of composition $CaWO_{1.5}N_{1.5}$.

The conductivity was measured as a function of temperature. FIG. 5 shows the curve log $\sigma=f(1/T)$.

The increase in conductivity with temperature is indicative of a semiconductive character. The value of $\sigma$ is lower than in the case of the Ln-W pairs investigated earlier.

Two values of the activation energies $\Delta E$ can be calculated, depending on temperature ranges considered.

85<T<125° K. $\Delta E=0.011$ eV.

200<T<300° K. $\Delta E=0.033$ eV.

These results can be linked with the value of the formal oxidation state of tungsten which is in this case equal to 5.5, a value which is higher than the mean value of 5.3 found for the compounds LnW(O,N)$_3$.

2.2 SrMoO$_{1.9}$N$_{1.1}$

Figure 6:
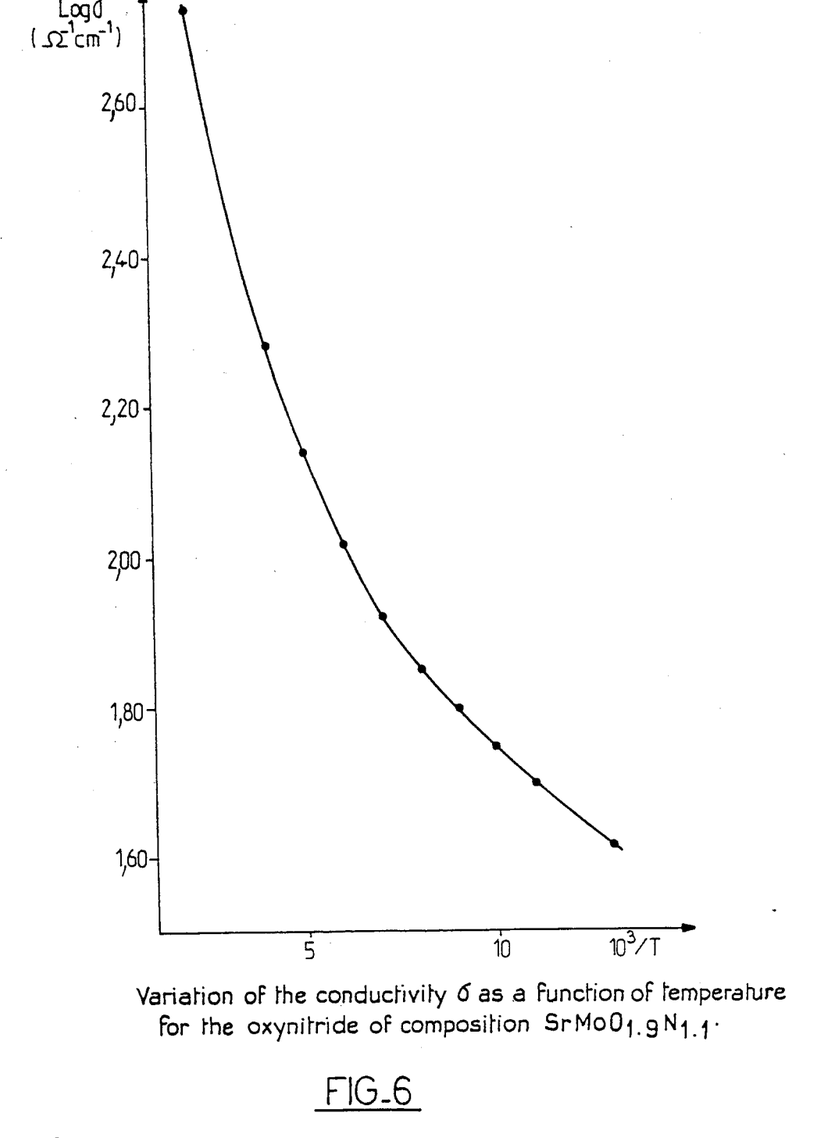
FIG. 6 shows the variation of the conductivity 6 as a function of temperature for the oxynitride of composition $SrMoO_{1.9}N_{1.1}$.

The curve in FIG. 6, representing log $\sigma=f(1/T)$ shows that this compound is semiconductive.

The conductivity and activation energy values are of the same order of magnitude as for the Ln-W systems:

85<T<125° K. $\Delta E=0.004$ eV

200<T<300° K. $\Delta E=0.016$ eV

In this compound, the formal oxidation state of molybdenum is equal to 5.1.

2.3 LaV(O,N)$_3$

As indicated earlier, evidence has been found for a wide range of composition included between LaVO$_3$ and LaVO$_2$N, for which the oxidation state of vanadium varies, therefore, between III and IV.

Measurements have been carried out on a perovskite having the composition LaVO$_{2.7}$N$_{0.3}$.

Figure 7:
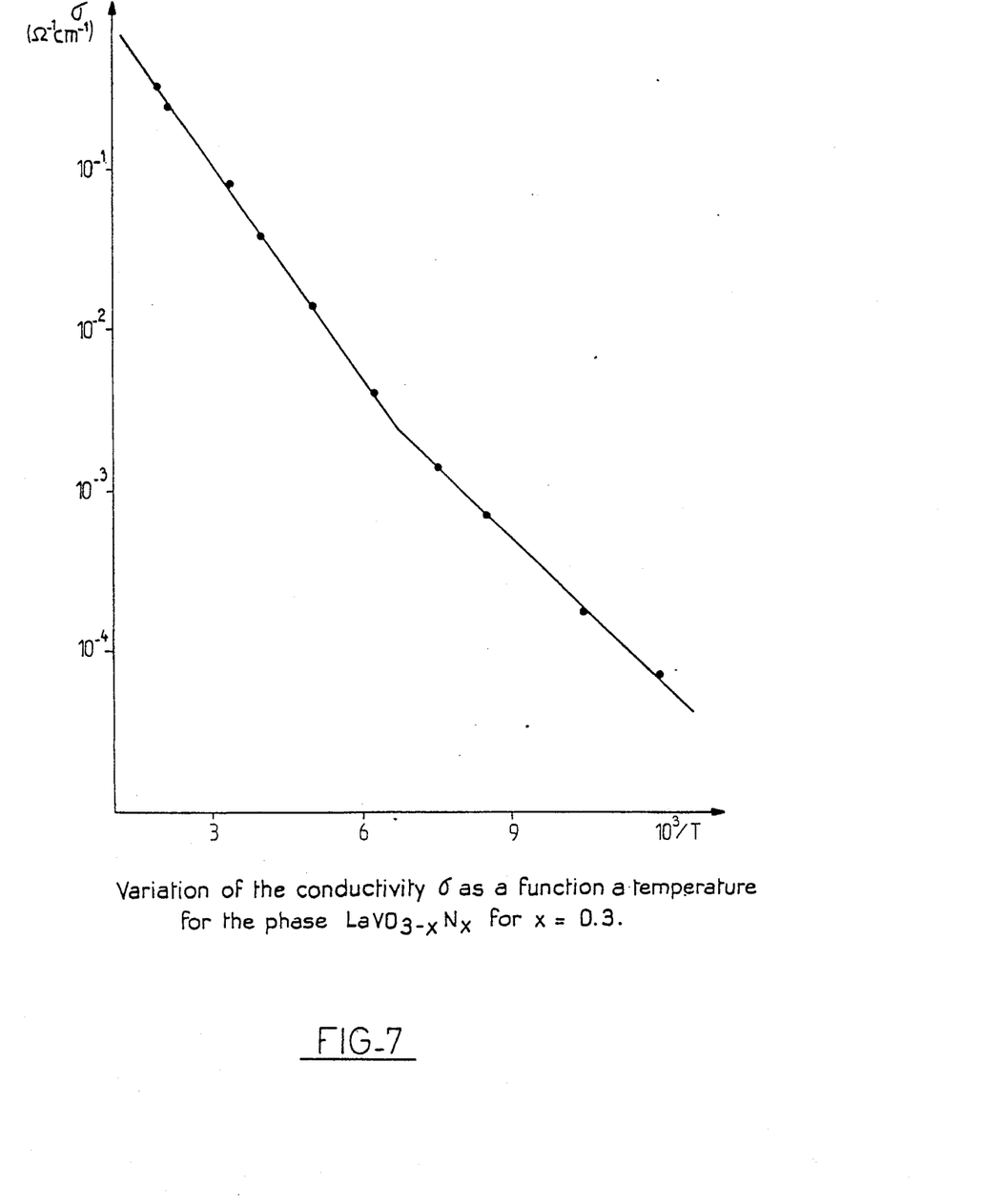
FIG. 7 shows the variation of the conductivity 6 as a function of temperature for the phase $LaVO_{3-x}N_x$ for $x=0.3$.

The curve in FIG. 7, which shows the variation $\sigma$ as a function of 1/T, shows a semiconductive behavior. There is a change in gradient at about 150° K.; this phenomenon has been reported for LaVO$_3$ (137° K.) and is attributed to an antiferromagnetic transition.

The corresponding activation energies are:

$\Delta E=0.06$ for T<150° K.

$\Delta E=0.08$ for T>150° K.

The conductivity $\sigma$ is equal to 0.1 $\Omega^{-1}$ cm$^{-1}$ at 300° K. All these values are comparable to those which have been determined for LaVO$_3$.

The change in the thermoelectric power $\alpha$ as a function of temperature has been investigated. In contrast to what has been observed earlier in the case of the perovskites LnW(O,N)$_3$, a positive value of $\alpha$ is observed in this case, indicating that a p-type semiconductivity is involved.

Figure 8:
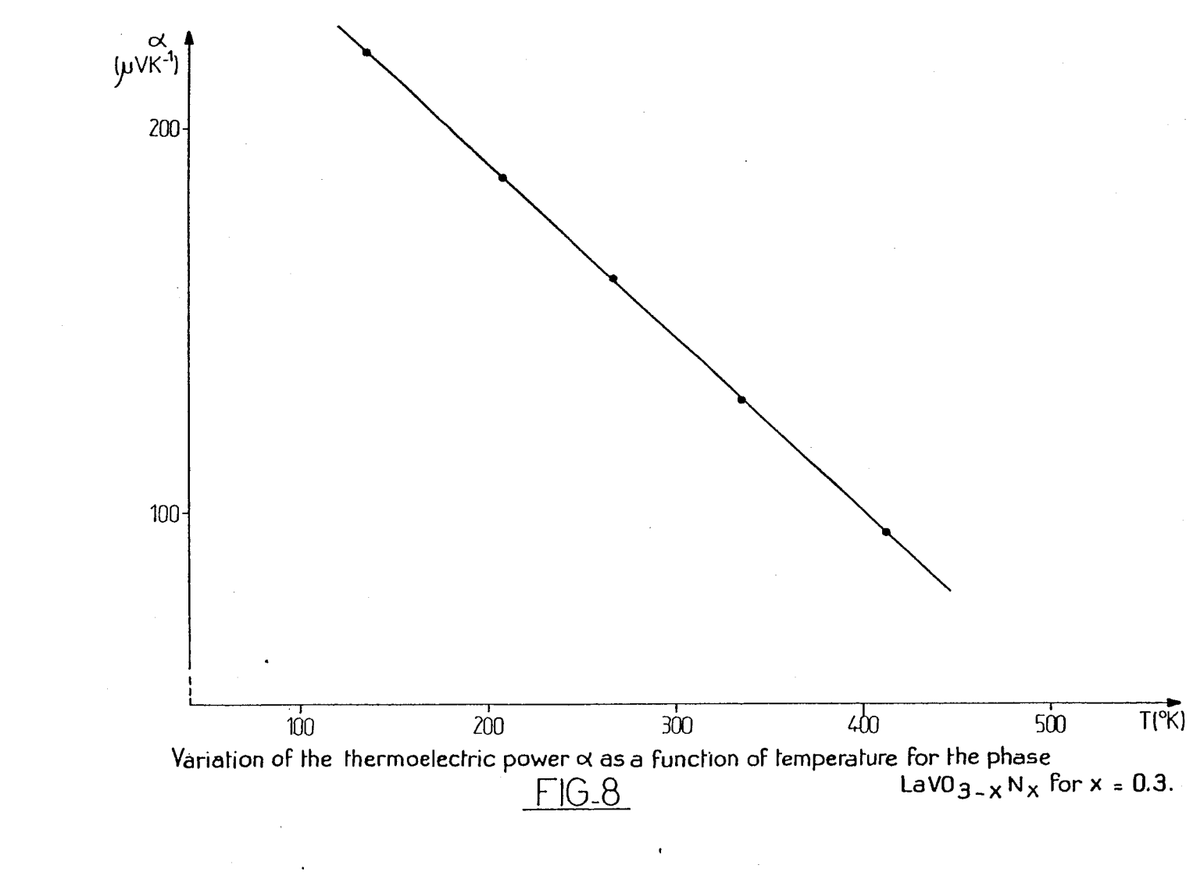
FIG. 8 shows the variation of the thermoelectric power $\alpha$ as a function of temperature for the phase $LaVO_{3-x}N_x$ for $x=3.0$ The invention is aimed more particularly at the perovskites of general formula I in which A is chosen from the group comprising Ca, Sr, Ba, La, Pr, Nd, Sm, Eu and Ce, and B is chosen from the group comprising W, Mo, V, Nb, Ta and Ti.

The curve $\alpha=f(T)$ in FIG. 8 shows the decrease in the Seebeck coefficient with rising temperature, which expresses a concurrent increase in the number of charge carriers. It can be seen, furthermore, that the change is linear.

The values of α at 250° and 500° K are as follows:

| T (K) | α (μV K$^{-1}$) |
|-------|-----------------|
| 250   | 270             |
| 500   | 75              |

Because of their electroconductive properties, the perovskites according to the invention find application as electrode material, especially for capacitors. The perovskites of the invention can thus be advantageously cosintered with another dielectric material to manufacture ceramic capacitors. The associated dielectric may itself consist of a perovskite containing oxygen and nitrogen of the type of those described in Patent Application No. EP-A-0,184,951. Such cosintering is carried out in a nonoxidizing atmosphere, advantageously in a nitrogen atmosphere, and optionally in the presence of sintering additives such as lithium-based compounds. Multilayer ceramic capacitors are thus obtained under excellent conditions, chiefly because of the very high compatibility of the two types of perovskites which are brought together. In fact, on the one hand the conductive oxynitrides are stable under the same atmospheric conditions as the dielectric perovskites and, on the other hand, the crystallographic lattices are in both cases very similar in size.

The electrical properties of the perovskites according to the invention also make it possible to envisage their use as a selective sensor. The use of semiconductive oxides as redox reaction catalysts has long been known. Their activity is generally linked with the presence of metallic elements with two oxidation states in the materials. This property has already been employed for the production of reductive gas sensors based on nonstoichiometric binary oxides such as $TiO_2$, $Fe_2O_3$ or $SnO_2$. This work has subsequently been extended to ternary oxides of perovskite or derived structures such as $LaMnO_3$ or $LaCoO_3$, whose catalytic activity is also well known.

Given that, in principle, the sensitivity of the materials is linked with the properties of adsorption of the gas onto the oxide, thick layers produced by silkscreen printing are generally employed and the variation in the electrical resistance of the material as a function of partial gas pressure is followed, the sensors needing, furthermore, to exhibit a gas detection response which is as fast as possible.

In the case of the perovskites containing oxygen and nitrogen with mixed valency according to the invention, of formula $AB(O,N)_3$, the oxidation state of the element B, or even of the combination A+B (for example $EuW(O,N)_3$) is linked directly to the proportion of nitrogen to oxygen in the compound.

In the case of this application, it has been shown that the sensitivity of the sensor is higher if the conductivity is not very high. Phases which are less conductive will therefore be preferably chosen in this case.

We claim:

1. A multi-layer ceramic capacitor comprising at least one dielectric element and conductive elements in which said conductive elements comprise conductive perovskites containing oxygen and nitrogen, corresponding to the general formula I $$AB(O,N)_3 \qquad (I)$$

in the cationic lattice of which:
A denotes a metal chosen from the metals of groups IA and IIA, yttrium and the lanthanides,
B denotes a metal chosen from the transition metals of groups IVA to IB,
on the express condition that at least one of the metals A and B is present in an oxidation state other than its normal maximum oxidation state.

2. A capacitor as claimed in claim 1, wherein at least one of the metals A and B in said perovskites is present in a mixed valency state.

3. A capacitor as claimed in claim 1 or 2, wherein at least part of the anionic site in said perovskites is vacant.

4. A capacitor as claimed in claim 1 or 2, which contain at least one cationic vacancy in the metal A in said perovskites.

5. A capacitor as claimed in claim 1 or 2, wherein the metal A in said perovskites is selected from the group consisting of Ca, Sr, Ba, La, Pr, Nd, Sm, Eu and Ce.

6. A capacitor as claimed in claim 1 or 2, wherein the metal B in said perovskites is selected from the group consisting of W, Mo, V, Nb, Ta and Ti.

7. A capacitor as claimed in claim 1 or 2, in which said perovskites are chosen from:

$LaV(III)_{1-x}V(IV)_xO_{3-x}N_x$ with $<x\leq 1$ $CaW(VI)_{1-x}W(V)_xO_{1+x}N_{2-1}$ with $0.4\leq x\leq 0.6$ $SrW(VI)_{1-x}W(V)_xO_{1+x}N_{2-x}$ with $0.8\leq x\leq 1$ $BaW(VI)_{1-x}W(V)_xO_{1+x}N_{2-x}$ with $0.8\leq x\leq 1$ $SrMo(VI)_{1-x}Mo(V)_xO_{1+x}N_{2-x}$ with $0.8+\leq x\leq 1$ $LaW(VI)_{1-x}W(V)_xO_xN_{3-x}$ with $0.6\leq x\leq 0.8$ $PrW(VI)_{1-x}W(V)_xO_xN_{3-x}$ with $0.6\leq x\leq 0.8$ $NdW(VI)_{1-x}W(V)_xO_xN_{3-x}$ with $0.6\leq x\leq 0.8$ $Eu(III)_{1-y}Eu(II)_yW(VI)_{1-x}W(V)_xO_{x+y}N_{3-(x+y)}$ with $0.5\leq x+y\leq 1.5$.

8. Process for the preparation of a multilayer ceramic capacitor as claimed in claim 1 or 2, wherein a mixed oxide of metals A and B is subjected to a nitriding in a stream of ammonia at a temperature of between 700° C. and 900° C. and the perovskites thus obtained is cosintered with a dielectric material.

9. Process as claimed in claim 8, wherein the said oxide is selected from the group consisting of tungstates, molybdates and vanadates.

10. Process as claimed in claim 9, wherein said oxide is selected from the group consisting of $CaWO_4$, $SrWO_4$, $BaWO_4$, $LaW_2O_9$, $SrMoO_4$, $LaVO_4$ and $LaVO_3$.

11. A capacitor as claimed in claim 1 or 2 in which said dielectric elements are also perovskites containing oxygen and nitrogen.

12. A capacitor as claimed in claim 11 which is prepared by cosintering conductive perovskites containing oxygen and nitrogen with dielectric perovskites containing oxygen and nitrogen in a nonoxidizing atmosphere.

* * * * *

UNITED STATES PATENT AND TRADEMARK OFFICE
CERTIFICATE OF CORRECTION

PATENT NO. : 4,964,016

DATED : October 16, 1990

INVENTOR(S) : Roger Marchand et al.

It is certified that error appears in the above—identified patent and that said Letters Patent is hereby corrected as shown below:

Column 4, in Table I, in the second column from the left (under "h kl") change the fourth item from "20" to --200--.

Column 4, in Table I, in the fourth column from the right (under "$I/I_0$"), delete the third item ("11").

Column 6, in Table II, in the sixth column from the left (under "$I/I_0$"), change the third item from the bottom from "40" to --30--.

Column 8, line 16, in Table III, in the left column, change "3.296" to --3.926--.

Column 9, line 8, in the equation, change the equal sign (=) to -- $\simeq$ --, indicating "equals about."

Column 12, line 31, in claim 7, before "<" insert --0--(zero).

Signed and Sealed this

Nineteenth Day of May, 1992

Attest:

DOUGLAS B. COMER

Attesting Officer

Acting Commissioner of Patents and Trademarks